US008436962B2

(12) United States Patent
Ajichi et al.

(10) Patent No.: US 8,436,962 B2
(45) Date of Patent: May 7, 2013

(54) ILLUMINATION DEVICE AND LIQUID CRYSTAL DISPLAY DEVICE

(75) Inventors: Yuhsaku Ajichi, Osaka (JP); Takeshi Masuda, Osaka (JP); Yukihide Kohtoku, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 485 days.

(21) Appl. No.: 12/593,806

(22) PCT Filed: Jul. 14, 2008

(86) PCT No.: PCT/JP2008/062699
§ 371 (c)(1),
(2), (4) Date: Sep. 29, 2009

(87) PCT Pub. No.: WO2009/016950
PCT Pub. Date: Feb. 5, 2009

(65) Prior Publication Data
US 2010/0060818 A1    Mar. 11, 2010

(30) Foreign Application Priority Data

Jul. 27, 2007 (JP) ................................. 2007-196671
Feb. 5, 2008 (JP) ................................. 2008-025686

(51) Int. Cl.
*G02F 1/1335* (2006.01)
(52) U.S. Cl.
USPC ........................................................... 349/64
(58) Field of Classification Search ........................ None
See application file for complete search history.

(56) References Cited

U.S. PATENT DOCUMENTS 5,262,928 A   11/1993   Kashima
5,957,561 A    9/1999   Ono et al.
(Continued)

FOREIGN PATENT DOCUMENTS

CN          1751253 A      3/2006
CN       101097054 A      1/2008
(Continued)

OTHER PUBLICATIONS machine translation of JP 2000-171641, Jun. 23, 2000.*
(Continued)

*Primary Examiner* — Lucy Chien
(74) *Attorney, Agent, or Firm* — Nixon & Vanderhye P.C.

(57) ABSTRACT

A backlight (illumination device; 2) of the present invention includes: multiple light sources (5); multiple light guide plates (7, 17, ... ) for causing surface emission of light from the light sources (5); and a diffusing plate (8) for diffusing light from the light guide plates (7, 17, ... ), the diffusing plate (8) being provided so as to be separate from and face the light guide plates (7, 17, ... ). Each of the light guide plates (7, 17, ... ) includes: a light-emitting section (7b) having a light-emitting surface (7a); and a light guide section (7c) for guiding, to the light-emitting section (7b), light from the light sources (5), a light-emitting section (17b) of the first light guide plate (17) being provided above a light guide section (7c) of the second light guide plate (7) adjacent to the first light guide plate (17). A light amount adjusting section (11) for reducing the amount of light incident on it is provided so as to be separate from the diffusing plate (8) and so that the orthogonal projection of the light amount adjusting section (11) onto the light-emitting region covers the boundary between any adjacent light guide plates (7, 17, ... ). This allows for production of a tandem-type illumination device having further improved luminance uniformity.

21 Claims, 12 Drawing Sheets

U.S. PATENT DOCUMENTS

| | | |
|---|---|---|
| 6,241,358 B1 | 6/2001 | Higuchi et al. |
| 6,561,663 B2 | 5/2003 | Adachi et al. |
| 6,580,477 B1 | 6/2003 | Cho |
| 8,092,064 B2 | 1/2012 | Erchak et al. |
| 2001/0017774 A1 | 8/2001 | Ito et al. |
| 2001/0053072 A1 | 12/2001 | Takemoto |
| 2002/0024803 A1 | 2/2002 | Adachi et al. |
| 2002/0036905 A1 | 3/2002 | Mabuchi |
| 2002/0197051 A1 | 12/2002 | Tamun et al. |
| 2003/0206253 A1 | 11/2003 | Cho |
| 2004/0001345 A1 | 1/2004 | Lee |
| 2004/0129058 A1 | 7/2004 | Boyd et al. |
| 2004/0145915 A1 | 7/2004 | Kim et al. |
| 2005/0168967 A1 | 8/2005 | Kao et al. |
| 2005/0281053 A1 | 12/2005 | Marra |
| 2006/0245213 A1 | 2/2006 | Everaerts et al. |
| 2006/0221638 A1* | 10/2006 | Chew et al. .......... 362/613 |
| 2007/0058393 A1 | 3/2007 | Kim et al. |
| 2007/0147073 A1 | 6/2007 | Sakai et al. |
| 2007/0147089 A1 | 6/2007 | Lin et al. |
| 2007/0247869 A1 | 10/2007 | Lang et al. |
| 2008/0030650 A1 | 2/2008 | Kitagawa et al. |
| 2008/0101068 A1 | 5/2008 | Kitamura et al. |
| 2011/0025730 A1 | 2/2011 | Ajichi |
| 2011/0221361 A1 | 9/2011 | Cornelissen et al. |

FOREIGN PATENT DOCUMENTS

| | | |
|---|---|---|
| EP | 1 424 576 A1 | 6/2004 |
| JP | 02-111922 | 4/1990 |
| JP | 4-267222 A | 9/1992 |
| JP | 9-282921 | 10/1997 |
| JP | 11-288611 | 10/1999 |
| JP | 2000-171641 | 6/2000 |
| JP | 2000-258633 | 9/2000 |
| JP | 2001-75096 | 3/2001 |
| JP | 2001-84822 A | 3/2001 |
| JP | 2001-184929 A | 7/2001 |
| JP | 2001-312916 | 11/2001 |
| JP | 2002-042537 | 2/2002 |
| JP | 2002-72204 | 3/2002 |
| JP | 2002-099250 | 4/2002 |
| JP | 2002-109935 A | 4/2002 |
| JP | 2003-43266 | 2/2003 |
| JP | 2003-295184 | 10/2003 |
| JP | 2003-308718 A | 10/2003 |
| JP | 2004-127918 A | 4/2004 |
| JP | 2004-170698 A | 6/2004 |
| JP | 2004-178850 | 6/2004 |
| JP | 2004-228092 A | 8/2004 |
| JP | 2004-319253 | 11/2004 |
| JP | 2005-153488 A | 6/2005 |
| JP | 2006-522436 A | 9/2006 |
| JP | 2006-286638 | 10/2006 |
| JP | 2006-296639 A | 10/2006 |
| JP | 2007-188863 A | 7/2007 |
| JP | 2007-287678 A | 11/2007 |
| JP | 2008-108622 A | 5/2008 |
| RU | 6259 U1 | 3/1998 |
| RU | 46 865 U1 | 7/2005 |
| WO | 2005/071449 A2 | 8/2005 |
| WO | 2005/114273 A1 | 12/2005 |
| WO | 2009/098809 A1 | 8/2009 |

OTHER PUBLICATIONS

International Search Report for PCT/JP2008/062699 mailed Aug. 19, 2008.

U.S. Appl. No. 12/599,566, filed Nov. 10, 2009, entitled "Illumination Device, Display Device, and Light Guide Plate".

U.S. Appl. No. 12/599,944, filed Nov. 12, 2009, entitled "Illumination Device and Display Device".

U.S. Appl. No. 12/599,853, filed Nov. 12, 2009, entitled "Illumination Device and Liquid Crystal Display Device".

Russian Notice of Allowance and English translation thereof mailed Feb. 28, 2012 in Russian application 2010144276.

Office Action mailed Apr. 9, 2012 in U.S. Appl. No. 12/746,816.

Supplementary EP Search Report mailed Dec. 30, 2010 in EP application 08872029.7.

U.S. Appl. No. 12/746,816, filed Jun. 8, 2010, entitled Illumination Device and Liquid Crystal Display Device.

EP Search Report mailed May 17, 2010 in EP application 08791678.9.

Office Action from U.S. Appl. No. 12/746,816 mailed Jun. 7, 2012.

Office Action from U.S. Appl. No. 12/599,944 mailed Jul. 10, 2012.

"Final" Office Action from U.S. Appl. No. 12/746,816 mailed Nov. 30, 2012; Masuda.

* cited by examiner

FIG. 13
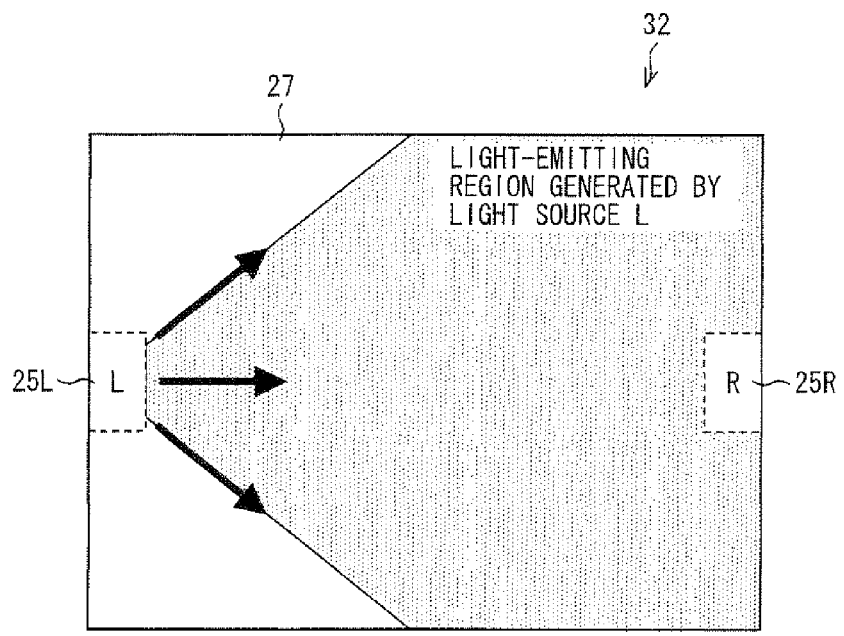
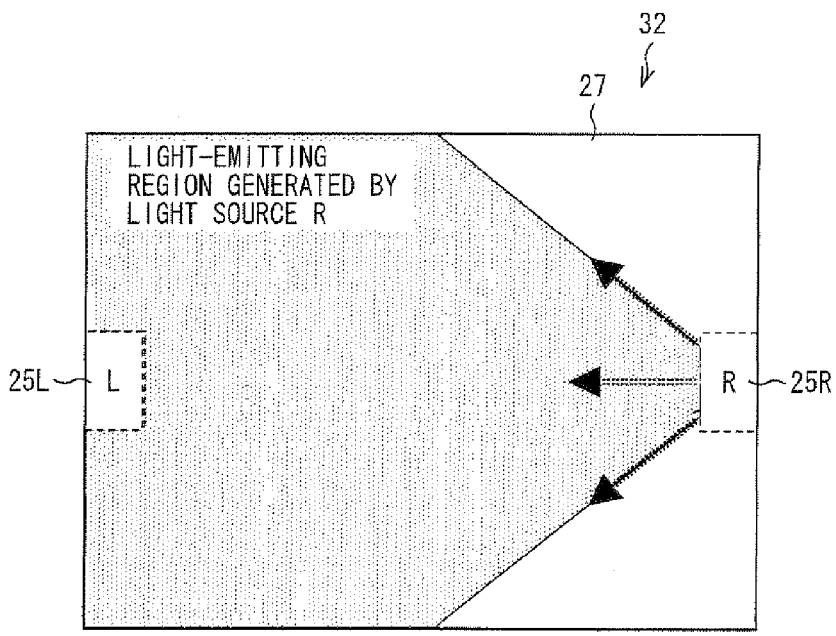

ILLUMINATION DEVICE AND LIQUID CRYSTAL DISPLAY DEVICE

This application is the U.S. national phase of International Application No. PCT/JP2008/062699 filed 14 Jul. 2008 which designated the U.S. and claims priority to Japanese Patent Application Nos. 2007-196671 filed 27 Jul. 2007 and 2008-025686 filed 5 Feb. 2008, the entire contents of each of which are hereby incorporated by reference.

1. Technical Field

The present invention relates to an illumination device used, for example, as a backlight of a liquid crystal display device, and also relates to a liquid crystal display device including the illumination device.

2. Background Art

Liquid crystal display devices have become rapidly popular in place of cathode ray tube (CRT) based display devices in recent years. The liquid crystal display devices have been in widespread use in liquid crystal televisions, monitors, mobile phones, and the like, which take advantage of, e.g., energy saving, thin, and lightweight features of the liquid crystal display devices. One way to further take advantage of such features is to improve an illumination device (i.e., a so-called backlight) which is provided behind the liquid crystal display device.

The illumination devices are roughly classified into a side light type (also referred to as an edge light type) and a direct type. The side light type is configured such that a light guide plate is provided behind a liquid crystal display panel and that a light source is provided at a lateral edge of the light guide plate. Light emitted from the light source is reflected by the light guide plate, so as to irradiate the liquid crystal display panel indirectly and uniformly. With this configuration, it is possible to realize an illumination device which has a reduced thickness and excellent luminance uniformity, although its luminance is low. For this reason, the side light type illumination device is mainly used in medium- to small-size liquid crystal displays such as a mobile phone and a laptop personal computer.

One example of the side light type illumination device is the one disclosed in Patent Literature 1. Patent Literature 1 discloses a surface-emitting device in which a reflecting surface of a light guide plate is provided with a plurality of dots for the purpose of allowing for uniform light emission from a light-emitting surface. In this surface-emitting device, light is not transmitted to a corner section of the reflecting surface due to directivity of a light source, and thereby the corner section of the reflecting surface is darkened. In order to deal with this, the corner section has a higher dot-density compared with other sections.

The direct type illumination device is provided with a plurality of light sources aligned behind a liquid crystal display panel, so as to directly irradiate the liquid crystal display panel. This makes it easier to obtain a high luminance even with a large screen. On this account, the direct type illumination device is mainly employed in a large liquid crystal display of 20 inches or more. However, a currently available direct type illumination device has a thickness of as much as approximately 20 mm to approximately 40 mm, and this becomes an obstacle to a further reduction in a thickness of the display.

The further reduction in the thickness of the large liquid crystal display can be achieved by shortening a distance between the light source and the liquid crystal display panel. In this case, however, it is impossible for the illumination device to achieve luminance uniformity unless the number of light sources is increased. However, increasing the number of light sources increases a cost. In view of this, there is a need for developing an illumination device which is thin and has excellent luminance uniformity, without increasing the number of light sources.

Conventionally, in order to solve these problems, such an attempt has been conducted that a plurality of side light type illumination devices are aligned and thereby the thickness of the large liquid crystal display is reduced.

For example, Patent Literature 2 proposes a planar light source device that can secure a wide light-emitting area with a compact structure and therefore can be suitably used in a large liquid crystal display. This planar light source device has a tandem structure in which board-shaped light guide blocks are aligned tandemly and each of the light guide blocks is provided with a first light source for supplying each of the light guide blocks with first light.

An illumination device configured, as described above, such that a plurality of light-emitting units each of which is made by a combination of a light source and a light guide plate are aligned is called a tandem type illumination device.

Citation List

Patent Literature 1

Japanese Patent Application Publication, Tokukai, No. 2003-43266 (Publication Date: Feb. 13, 2003)

Patent Literature 2

Japanese Patent Application Publication, Tokukaihei, No. 11-288611 (Publication Date: Oct. 19, 1999)

Patent Literature 3

Japanese Patent Application Publication, Tokukai, No. 2001-312916 (Publication Date: Nov. 9, 2001)

Patent Literature 4

Japanese Patent Application Publication, Tokukai, No. 2001-75096 (Publication Date: Mar. 23, 2001)

SUMMARY OF INVENTION

However, in the illumination device configured by the combination of the light guide plates and the light sources as described above, aligning the plurality of light guide plates planerly poses such a problem that luminance still becomes non-uniform because of luminance unevenness caused by a bright line appearing in a region corresponding to a joint between the light guide plates.

The following description deals with a principle on which bright lines occur. FIG. 16 is a cross-section view schematically illustrating a configuration of light guide plates included in a tandem-type backlight. FIGS. 18 and 19 are each a view schematically illustrating traveling directions of light transmitted in the light guide plates.

As shown in FIG. 16, a first light guide plate (on a left side in FIG. 16) and a second light guide plate (on a right side in FIG. 16) adjacent to the first light guide plate are disposed so as to overlap one another with no gap between them. As shown in FIG. 18, most light from each light source is transmitted through a corresponding light guide plate while being repeatedly subjected to total reflection, and is then emitted from a corresponding light-emitting surface to outside. However, as shown in FIG. 19, part of the light from the light source is not reflected in the light guide plate and thus directly arrives at an end surface (7e) opposite from the light source. Such part of the light is not absorbed by a reflecting sheet 6 and thus does not attenuate in its amount. Therefore, the part has a high intensity. This causes the part of the light emitted from the end surface (7e) to appear as a bright line.

In this regard, according to the arrangement of FIG. 16, light is emitted from an end surface (7e) of the second light guide plate (on the right side in FIG. 16), the end surface being opposite from a corresponding light source. The light then enters the first light guide plate (on the left side in FIG. 16) and is transmitted through it (indicated by arrows having bold solid lines in FIG. 16). The light is repeatedly subjected to total reflection in this first light guide plate and is then emitted from a light-emitting surface of the first light guide plate. The arrangement of FIG. 16 includes multiple light guide plates that together form a light-emitting surface having no gap as described above. This prevents occurrence of bright lines and thereby allows for uniform luminance.

For actual use, however, light guide plates are normally so manufactured as to have a minus tolerance in order, e.g., to prevent adjacent light guide plates from damaging each other, to thin illumination devices, and to tolerate manufactural errors. This results in a gap corresponding to the tolerance at a joint between the first light guide plate and the second light guide plate (see FIG. 17). This causes light emitted from the end surface (7e) of the second light guide plate, the end surface being opposite from the light source, to partly enter the first light guide plate and to be partly emitted above (indicated by a bold solid arrow in FIG. 17) without entering the first light guide plate. As described above, such light emitted, not from the light-emitting surface, but from the end surface (7e) has an amount larger than an amount of light emitted from the light-emitting surface. Therefore, such light has a high intensity. This is a reason why the light emitted above from the end surface (7e) appears as a bright line.

A problem of bright lines described above occurs not only in tandem-type backlights, but also in backlights each having multiple light guide plates so arranged in a plane as not to overlap one another (such backlights are referred to as tile-type backlights; see FIG. 15).

In order to solve the above problem of bright lines, Patent Literature 3, for example, discloses an arrangement including a dot pattern for diffusing light emitted from a light guide plate, which dot pattern is provided throughout between light guide plates and a diffusing plate. This arrangement allows for diffusion of light causing bright lines and thereby reduces non-uniformity in luminance.

The above arrangement indeed reduces such luminance unevenness caused by bright lines. However, the arrangement causes a new problem of luminance unevenness caused by the pattern of the dots. The dot pattern does have a function of diffusing light for luminance uniformity. However, it is difficult to completely uniform luminance with use of the dot pattern. The dot pattern, which has a dot distribution density that varies depending on a distance from a light source, gives an effect on luminance unevenness.

Patent Literature 3 further discloses an arrangement including a light-blocking layer provided to the above end surface, from which light causing bright lines is emitted. This arrangement blocks light from the end surface, the light having a high luminance, and thereby prevents the occurrence of bright lines. Unfortunately, this arrangement prevents light from being emitted from the end surface. This causes a dark line in a region corresponding to the end surface and still impedes achievement of uniform luminance.

Further, Patent Literature 4 discloses an arrangement including a diffusing sheet having a reflecting material in order to prevent luminance non-uniformity along a boundary between adjacent light supplier units. This arrangement prevents the occurrence of bright lines in a region including the reflecting material. However, the region including the reflecting material prevents transmission of light. This contrarily results in the region being observed as a dark line by a viewer and still impedes the achievement of uniform luminance.

Using such an illumination device as a backlight in a display device impairs display quality.

The present invention was made in view of the foregoing problems, and an object of the present invention is to provide an illumination device which further improves its luminance uniformity.

In order to attain the above object, an illumination device of the present invention includes: a plurality of light sources; a plurality of light guide plates each for causing surface emission of light from at least one of the plurality of light sources; and a diffusing plate for diffusing light from the plurality of light guide plates, a light amount adjusting section for reducing an amount of light incident thereon being provided so as to be away from the diffusing plate, and so as to cover a boundary between any adjacent two of the plurality of light guide plates.

In order to attain the above object, an illumination device of the present invention includes: a plurality of light sources; a plurality of light guide plates each for causing surface emission of light from at least one of the plurality of light sources; and a diffusing plate for diffusing light from the plurality of light guide plates, each of the plurality of light guide plates including: a light-emitting section having a light-emitting surface; and a light guide section for guiding, to the light-emitting section, light from the plurality of light sources, a light-emitting section of one of any adjacent two of the plurality of light guide plates being provided above a light guide section of the other of the any adjacent two of the plurality of light guide plates, the illumination device further comprising: a light amount adjusting section, for reducing an amount of light incident thereon, provided so as to be away from the diffusing plate, and so as to cover a boundary between (i) the light-emitting section of said one of the any adjacent two of the plurality of light guide plates and (ii) a light-emitting section of said other of the any adjacent two of the plurality of light guide plates.

As described above, light emitted, not from the light-emitting surface, but from the end surface (7e) of a light guide plate, the end surface being opposite from the light source, has an amount larger than the amount of light emitted from the light-emitting surface. Therefore, such light has a high luminance. This causes the light emitted from the end surface to appear as a bright line, and thereby causes luminance unevenness.

In this respect, the above arrangement includes light amount adjusting sections for reducing the amount of light incident on them, which light amount adjusting sections are separate from the diffusing plate and are provided so as to cover the boundary between any two adjacent light guide plates.

This allows reducing the amount of light transmitting through the light amount adjusting sections and thereby reduce luminance of such light to a level lower than a level of luminance of light emitted from the end surface directly to the outside. Further, the provision of the light amount adjusting sections separately from the diffusing plate allows for formation of a light diffusing region between the light amount adjusting sections and the diffusing plate. This reduces the occurrence of bright lines, and also further improves luminance uniformity as compared to conventional arrangements.

In order to attain the above object, an illumination device of the present invention includes: a plurality of light sources; a plurality of light guide plates each for causing surface emission of light from at least one of the plurality of light sources; and a diffusing plate for diffusing light from the plurality of light guide plates, the plurality of light guide plates being juxtaposed so as not to overlap one another, a light amount adjusting section for reducing an amount of light incident thereon being provided so as to be away from the diffusing plate, and so as to cover a boundary between any adjacent two of the plurality of light guide plates.

The above arrangement of the light guide plates allows for production of a tile-type illumination device. The arrangement further allows for achievement of effects similar to the above effects even in a tile-type illumination device. Specifically, the above light amount adjusting section is disposed so as to be separate from the diffusing plate and to cover the boundary between any two adjacent light guide plates. This prevents the occurrence of a bright line caused by light having a high intensity, which light is emitted from the end surface of each light guide plate, which end surface is located at the boundary between two adjacent light guide plates. This consequently improves luminance uniformity.

The illumination device of the present invention may be arranged such that the light amount adjusting section is provided in a region which is closer to the plurality of light guide plates and which is between the diffusing plate and the plurality of light guide plates.

The above arrangement allows for a large distance between the light amount adjusting section and the diffusing plate, i.e., a large light diffusing region. This allows for further diffusion of light that has been emitted from the end surface opposite from the light source and that has an amount reduced by the light amount adjusting section. This further improves luminance uniformity.

The illumination device of the present invention may be arranged such that the light amount adjusting section is provided above the light-emitting surfaces of the any adjacent two of the plurality of light guide plates so as to go over and cover the boundary.

The above arrangement causes the light amount adjusting section to cover the boundary between any adjacent two light guide plates. This allows light emitted from the end surface opposite from of the light source to be surely emitted onto the light amount adjusting section. In other words, no light emitted from the end surface leaks out directly to the outside without passing the light amount adjusting section. This surely reduces the amount of light causing bright lines, and thereby further improves luminance uniformity.

The illumination device of the present invention may be arranged such that the light amount adjusting section is made of a semi-transmissive material for reducing an amount of transmitting light.

This reduces the amount of light that has been emitted onto the light amount adjusting section, and thereby reduces the occurrence of bright lines.

The illumination device of the present invention may be arranged such that the light amount adjusting section has a function of reducing an amount of transmitting light and a function of reflecting light.

This reduces the amount of light transmitting through the light amount adjusting section and further reflects light emitted onto the light amount adjusting section. This allows for diffusion of more light and thereby further improves luminance uniformity.

A liquid crystal display device of the present invention includes any of the above the illumination devices as a backlight.

According to the above arrangement, the inclusion of one of the illumination devices of the present invention allows for production of a liquid crystal display device having superior luminance uniformity.

Additional objects, features, and strengths of the present invention will be made clear by the description below. Further, the advantages of the present invention will be evident from the following explanation in reference to the drawings.

BRIEF DESCRIPTION OF DRAWINGS

FIG. 13 is a view schematically illustrating traveling directions of light from light sources included in a light guide plate unit, where (a) schematically illustrates traveling directions of light from a light source provided on one side (left side) of the light guide plate unit, and (b) schematically illustrates traveling directions of light from another light source provided on the other side (right side) of the light guide plate unit

DESCRIPTION OF EMBODIMENTS

[Embodiment 1]

A first embodiment of the present invention is described below with reference to FIGS. 1 through 7. Note that the present invention is not limited to this.

The present embodiment describes an illumination device used as a backlight of a liquid crystal display device.

Figure 1:
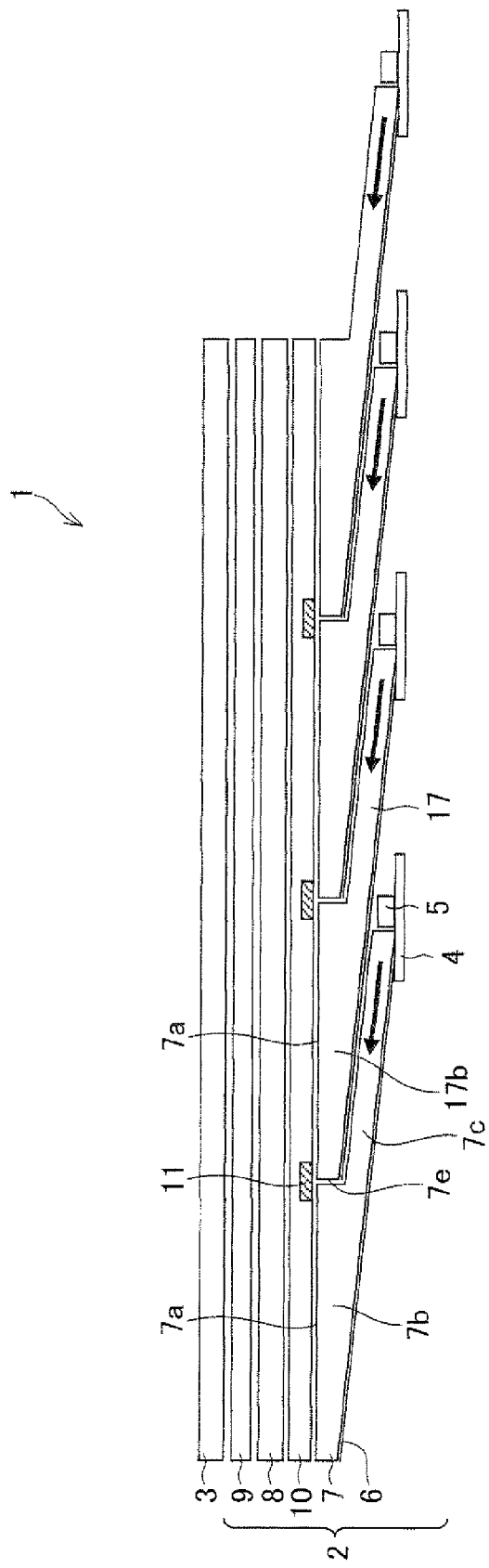
FIG. 1 is a cross-section view schematically illustrating the configuration of a liquid crystal display device in accordance with a first embodiment of the present invention.

FIG. 1 is a cross-section view schematically illustrating a configuration of a liquid crystal display device 1 according to the present embodiment. The liquid crystal display device 1 includes: a backlight 2 (illumination device); and a liquid crystal display panel 3 so provided as to face the backlight 2.

The liquid crystal display panel 3 is similar to a liquid crystal display panel generally used in a conventional liquid crystal display device. For example, the liquid crystal display panel 3 is so configured as to include: an active matrix substrate on which a plurality of thin film transistors (TFTs) are formed; a CF substrate facing the active matrix substrate; and a liquid crystal layer sealed between the active matrix substrate and the CF substrate by means of a sealing material (all of which are not shown in FIG. 1).

A configuration of the backlight 2 provided in the liquid crystal display device 1 is described in detail below.

The backlight 2 is provided behind the liquid crystal display panel 3 (on an opposite side of a display surface). As shown in FIG. 1, the backlight 2 includes substrates 4, light sources 5, reflecting sheets 6, light guide plates 7, a diffusing plate 8, an optical sheet 9, a transparent plate 10, and light amount adjusting sections 11. Note that the backlight 2 includes at least two light guide plates. For convenience of explanation, the present embodiment takes a first light guide plate 7 and a second light guide plate 17 for example. Also, description of the present embodiment takes the first light guide plate 7 to represent both light guide plates 7 and 17 unless otherwise stated.

The light sources 5 are each, for example, a side light-emitting type light-emitting diode (LED) or a cold cathode fluorescent tube (CCFL). Description herein deals with, as one example, LEDs as the light sources 5. By using, as the light sources 5, the side light-emitting type LEDs each including chips of R, G, and B molded into one package, it is possible to achieve an illumination device capable of a wide range of color reproduction. Note that the light sources 5 are each provided on its corresponding substrate 4.

The light guide plates 7 each cause surface emission of light from its light-emitting surface 7a, the light having been emitted from its corresponding light source 5. The light-emitting surface 7a is a surface for emitting light toward an irradiation object. In the present embodiment, the light guide plates 7 employ a tandem configuration as shown in FIG. 1. That is, the light guide plates 7 are arranged such that: (i) each light guide plate 7 includes (a) a light-emitting section 7b including the light-emitting surface 7a and (b) a light guide section 7c for directing, to the light-emitting section 7b, light emitted from the corresponding light source 5; (ii) the light-emitting section 7b and the light guide section 7c have different thicknesses at least at a connection between them; and (iii) the light-emitting section 17b of the first light guide plate 17 is placed on the light guide section 7c of the second light guide plate 7. This allows a plurality of light guide plates 7, 17, . . . to form a flush light-emitting surface (the light-emitting surface of the backlight 2 as a whole; light-emitting region). The end surface 7e is located opposite from the light source 5.

Figure 2:
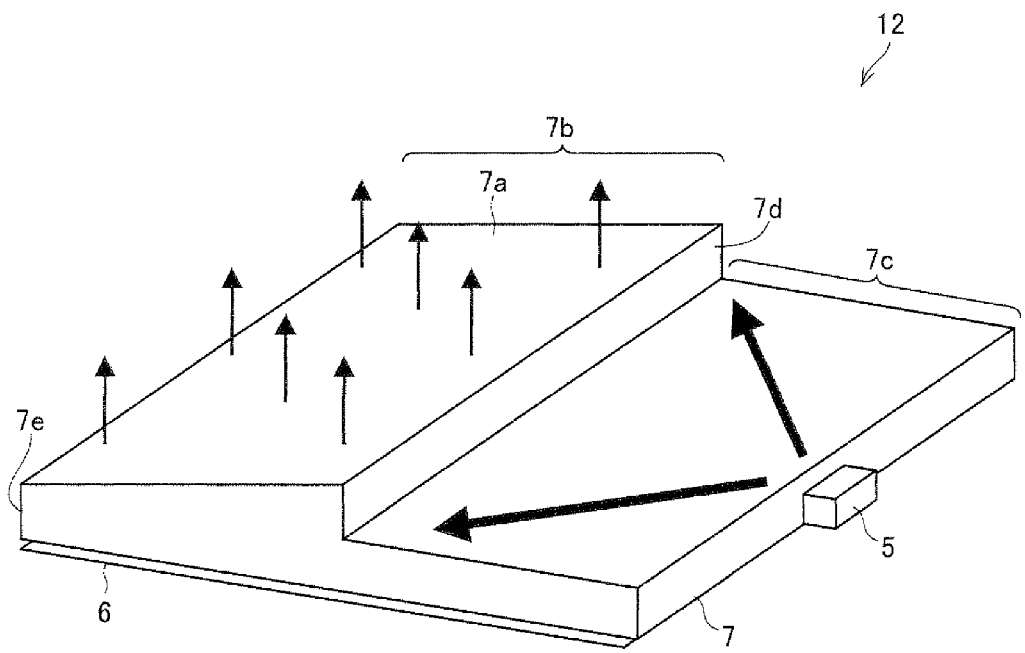
FIG. 2 is a perspective view schematically illustrating the configuration of a light guide plate unit included in the liquid crystal display device.

FIG. 2 is a perspective view schematically illustrating a configuration of a light guide plate unit 12 included in the liquid crystal display device 1 shown in FIG. 1. The light guide plate unit 12 diffuses light emitted from its light source 5 for plane emission. The light guide plate unit 12 includes a light source 5, a substrate 4 (see FIG. 1), a reflecting sheet 6, and a light guide plate 7. As shown in FIG. 2, light emitted from the light source 5 enters the light guide section 7c of the light guide plate 7. The light is then transmitted through the light guide section 7c, and reaches the light-emitting section 7b. A front surface (light-emitting surface 7a) or a back surface of the light-emitting section 7b of the light guide plate 7 has been subjected to a process or a treatment (not shown) each of which is for causing light which has been guided thereto to be emitted toward the front surface. Thereby, the light is emitted from the light-emitting surface 7a of the light guide plate 7 toward the liquid crystal display panel 3. Examples of a specific method for the process or the treatment applied to the light-emitting section 7b of the light guide plate 7 encompass prism processing, texturing, and print processing. However, the method is not particularly limited, and may be a publicly known method as needed.

Further, the light guide plate 7 is mainly made from a transparent resin such as a polycarbonate (PC) or a polymethyl methacrylate (PMMA). However, the material is not particularly limited, but may preferably be a material having a high light transmittance. Further, the light guide plate 7 may be formed by means of, for example, injection molding or extrusion molding, hot-press molding, or cutting. However, the molding method used in the present invention is not particularly limited to these, and may be any processing method as long as it achieves a similar property.

The reflecting sheets 6 are each provided in contact with the back surface (a surface opposite to the light-emitting surface 7a) of the corresponding light guide plate 7. The reflecting sheets 6 each reflect light so as to allow the corresponding light-emitting surface 7a to emit a larger amount of light. Since the present embodiment includes multiple light guide plates, the reflecting sheets 6 are provided for the light guide plates 7, 17, . . . individually.

The diffusing plate 8 is so provided as to face the light-emitting surfaces 7a in such a manner as to cover the whole of the flush light-emitting surface formed by the light-emitting surfaces 7a of the light guide plates 7, 17 . . . . The diffusing plate 8 diffuses light emitted from the light-emitting surface 7a of each light guide plate 7 so that the light is emitted onto the optical sheet 9 (described later). The present embodiment uses, as the diffusing plate 8, "SUMIPEX E RMA10" (manufactured by Sumitomo Chemical Co., Ltd.) having a thickness of 2.0 mm. The diffusing plate 8 may be placed a predetermined distance away from the light-emitting surfaces 7a, the predetermined distance being set to 3.0 mm, for example.

The optical sheet 9 is made of a plurality of sheets stacked on one another, the optical sheet 9 being so placed as to face the front surface of each light guide plate 7. The optical sheet 9 uniforms and condenses light emitted from the light-emitting surface 7a of each light guide plate 7 so as to emit the light toward the liquid crystal display panel 3. That is, the following may be included in the optical sheet 9: a diffusing sheet for simultaneously condensing and diffusing light; a lens sheet for condensing light so as to improve luminance in a front direction (a direction toward the liquid crystal display panel); and a polarizing and reflecting sheet for reflecting a polarized component of light having a particular vibration pattern and transmitting other polarized components having other vibration patterns so as to improve luminance of the liquid crystal display device 1. It is preferable that these sheets should be used in combination as needed in accordance with an intended price and/or performance of the liquid crystal display device 1. In the present embodiment, as one example, "LIGHT-UP 250GM2" (manufactured by Kimoto Co., Ltd.) is used as the diffusing sheet, "Thick RBEF" (manufactured by Sumitomo 3M Ltd.) is used as a prism sheet (i.e., the lens sheet), and "DBEF-D400" (manufactured by Sumitomo 3M Ltd.) is used as a polarizing sheet (polarizing and reflecting sheet).

The transparent plate 10 is used to maintain a distance between the diffusing plate 8 and respective of the light guide plates 7, and forms a light diffusing region. The transparent plate 10 is made of a light-transmitting material such as a polyethylene film. Alternatively, the light guide plates 7 can face the diffusing plate 8 instead of providing the transparent plate 10.

The light amount adjusting sections 11 reduce the amount of light incident on them, and emit the light thus reduced to the outside. Thus, the light amount adjusting sections 11 are made of a semi-transmissive material so as to reduce the amount of transmitting light. Specifically, the light amount adjusting sections 11 are formed by, for example, printing a pattern in white ink. Alternatively, the light amount adjusting sections 11 may be formed by application or attachment of a half mirror such as a dielectric mirror, a polarizing and reflecting sheet, or a cholesteric liquid crystal layer. The light amount adjusting sections 11 can be formed by application of a resin having a high refractive index. The light amount adjusting sections 11 are not limited to the examples, provided that they have a function of reducing the amount of light.

Figure 18:
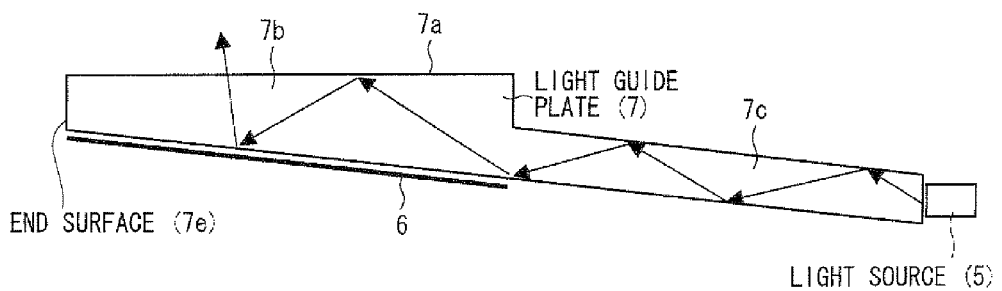
FIG. 18 is a view schematically illustrating traveling directions of light transmitted in the light guide plates shown in FIG. 17.

With the members, light emitted from the light sources 5 (i) travels in the light guide plates 7 while being scattered and reflected as shown in FIGS. 2 and 18, (ii) is emitted from the light-emitting surfaces 7a, and (iii) then reaches the liquid crystal display panel 3, via the diffusing plate 8 and the optical sheet 9.

(Luminance Uniformity)

The following describes a principle on which luminance becomes non-uniform.

As described above with reference to FIG. 18, the light from a light source 5 (i) enters a light guide section 7c of a corresponding light guide plate 7 at a critical angle, (ii) repeatedly carries out a total reflection in the light guide section 7c and then arrives at a light-emitting section 7b, is reflected from the reflecting sheet 6 provided on a rear surface of the light-emitting section 7b, and (iv) is ultimately emitted from the light-emitting surface 7a. As described above, most of the light emitted from the light source 5 is absorbed by the reflecting sheet 6 while being repeatedly reflected within the light guide plate 7. Therefore, the amount of light from the light source 5 decreases as the light is farther away from the light source 5.

Figure 19:
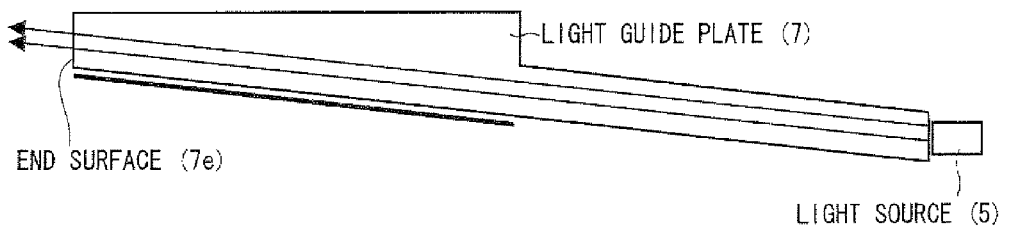
FIG. 19 is a view schematically illustrating traveling directions of light transmitted in the light guide plates shown in FIG. 17.

Unfortunately, as shown in FIG. 19, part of the light emitted from the light source 5 is not reflected within the light guide plate 7, and directly arrives at an end surface 7e, which is farther away from the light source 5. The part of the light is not absorbed by the reflecting sheet 6, and therefore its amount of light does not attenuate. This causes the part of the light to have an intensity higher than that of the light emitted from the light-emitting surface 7a.

Figure 17:
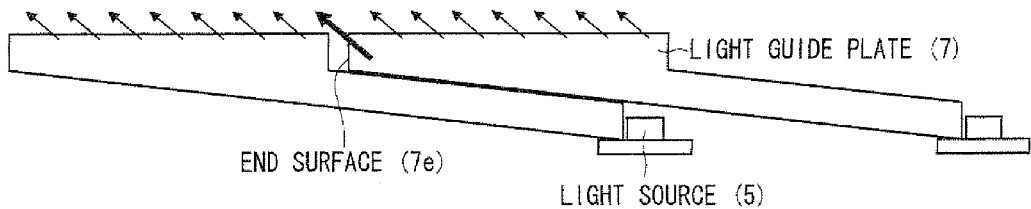
FIG. 17 is a cross-section view schematically illustrating the configuration of a light guide plate unit included in the liquid crystal display device shown in FIG. 1.

As shown in FIG. 17, a light guide plate having a tandem structure causes a gap between light-emitting sections of adjacent light guide plates. This causes part of the light emitted from a light source to be directly emitted to the outside from an end surface 7e of a corresponding light guide plate. This causes the part of the light having a high intensity to appear as a bright line on the liquid crystal display panel, thereby resulting in non-uniform luminance as a whole.

In view of the circumstances, the present embodiment includes the light amount adjusting sections 11 in order to reduce the amount of light emitted from each of the end surfaces 7e of the respective light guide plates. The following describes where the light amount adjusting sections 11 are specifically provided.

(Arrangement of the Light Amount Adjusting Sections 11)

Figure 3:
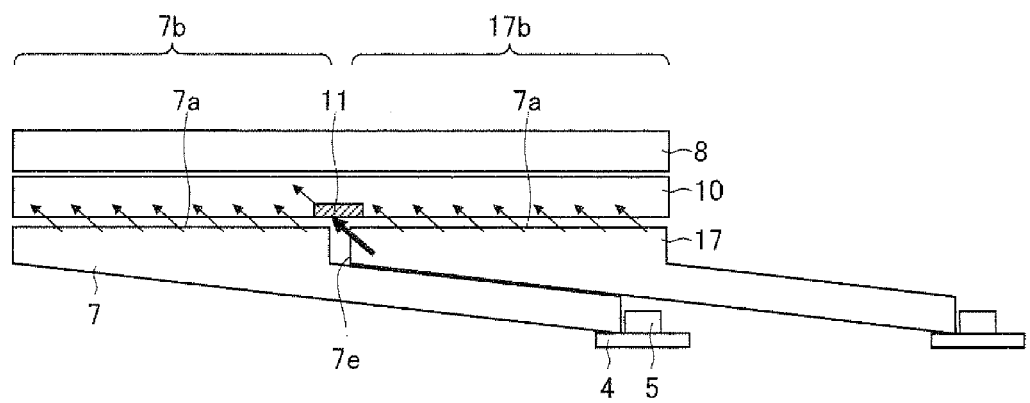
FIG. 3 is an enlarged cross-section view illustrating a part of the liquid crystal display device shown in FIG. 1.

FIG. 3 is an enlarged cross-sectional view of a part of the liquid crystal display device 1 shown in FIG. 1. As shown in FIG. 3, the light amount adjusting sections 11 are each provided in the vicinity of a boundary between a light-emitting section 7b of one of adjacent light guide plates 7 and a light-emitting section 17b of the other of adjacent light guide plates 17 so as to receive light emitted, not from a light-emitting surface 7a, but from an end surface 7e of the light guide plate 17. The end surface 7e is farther away from a corresponding light source 5. More specifically, the light amount adjusting sections 11 are separate from the diffusing plate 8 and are so disposed that an orthogonal projection of each light amount adjusting section 11 onto the light-emitting surface (light-emitting region) covers the boundary between the light-emitting section 7b of a first light guide plate 7 and the light-emitting section 17b of a second light guide plate 17. In other words, the light amount adjusting sections 11 are so disposed as to cover part of the light-emitting surface, the part showing bright lines.

This reduces the amount of light emitted from of the end surface 7e of the light guide plate 17, and in turn prevents increase in the luminance caused by the light that is emitted from the light source 5, directly arrives at the end surface 7e, and is then emitted from the end surface 7e. This consequently prevents the appearance of bright lines and thereby further improves luminance uniformity as compared to conventional arrangements.

Figure 4:
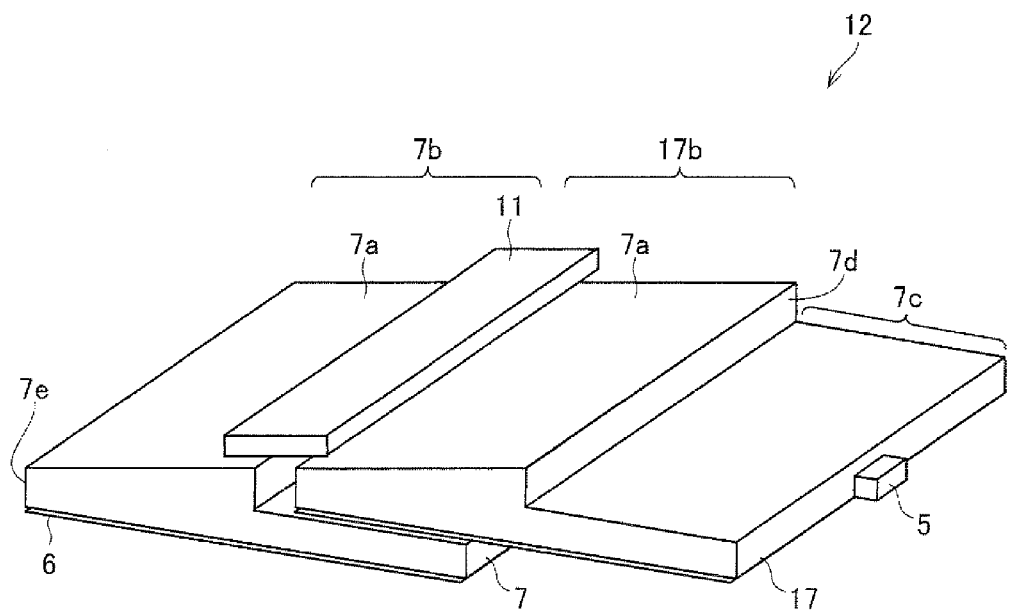
FIG. 4 is an enlarged perspective view illustrating a part of the liquid crystal display device shown in FIG. 3.

The above boundary linearly extends in the direction perpendicular to the surface of FIG. 3. Thus, the boundary is in the form of a band when seen in the direction toward the display screen of the liquid crystal display panel 3 (see FIG. 1). Therefore, as shown in FIG. 4, the light amount adjusting sections 11 are each preferably so formed as to extend linearly along the boundary.

The light amount adjusting sections 11 are preferably disposed locally above the light-emitting surfaces 7a. That is, the light amount adjusting sections 11 are each preferably so disposed as to entirely cover a band region including the boundary.

The light amount adjusting sections 11 as shown in FIG. 3 are formed integrally with or inside the transparent plate 10. However, the light amount adjusting sections 11 are not necessarily formed as such. The light amount adjusting sections 11 may be formed as a separate member and placed between the light guide plates 7 and, the transparent plate 10.

The following describes variations of the light amount adjusting sections 11.

(Variation 1)

Figure 5:
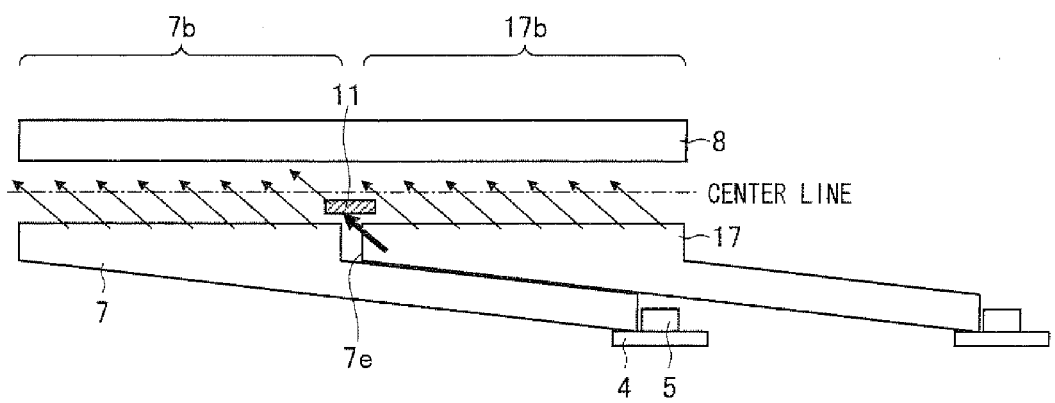
FIG. 5 is a cross-section view schematically illustrating the configuration of a part of a liquid crystal display device serving as variation 1.

FIG. 5 is a cross-section view schematically illustrating the configuration of a part of a liquid crystal display device 1 serving as variation 1. Variation 1 is a variation of the liquid crystal display device 1 having the configuration shown in FIG. 1. As shown in FIG. 5, variation 1 includes light amount adjusting sections 11 each provided at a position in a region between a light guide plate 7 and the diffusing plate 8, the position being closer to the light guide plates 7 and 17 than to the diffusing plate 8. That is, the light amount adjusting sections 11 are disposed closer to the light guide plates 7 and 17 than the central position (center line) of the region is to the light guide plates 7 and 17.

For convenience of explanation, the light amount adjusting section 11 of FIG. 5 is a member separate from the transparent plate 10. The light amount adjusting sections 11 may be formed integrally with the transparent plate 10 instead.

Better uniformity in the luminance is achieved by preferably securing a large light diffusing region, i.e., a large distance between the light guide plates 7 and the diffusing plate 8 and also a large distance between the light amount adjusting sections 11 and the diffusing plate 8. In view of this, the arrangement of variation 1 allows for a large distance between the light amount adjusting sections 11 and the diffusing plate 8, i.e., for a large light diffusing region. This allows for further diffusion of the light that is emitted from the end surface 7e of each light guide plate, the end surface 7e being located opposite from the corresponding light source 5, and is then reduced in its amount by the corresponding light amount adjusting section 11. This in turn further improves luminance uniformity.

Figure 6:
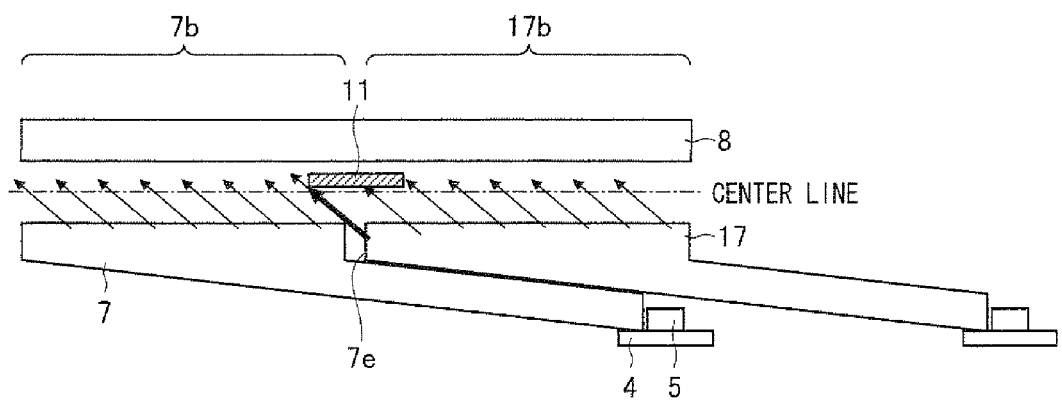
FIG. 6 is a cross-section view schematically illustrating the configuration of a part of a liquid crystal display device serving as variation 1, which liquid crystal display device has another arrangement.

The light amount adjusting sections 11 of the present invention are each simply required to be disposed a predetermined distance away from the diffusing plate 8. Thus, the present invention is not limited to the above arrangement. As shown in FIG. 6, the present invention may include light amount adjusting sections 11 each in a region between a light guide plate 7 and the diffusing plate 8, the region being closer to the diffusing plate 8. That is, the light amount adjusting sections 11 may each be disposed closer to the diffusing plate 8 than the central position (center line) of the region is to the diffusing plate 8. Even this arrangement forms a predetermined distance between the light amount adjusting sections 11 and the diffusing plate 8. This allows for diffusion of light having an amount reduced by the light amount adjusting sections 11. This advantageously improves luminance uniformity.

(Variation 2)

Figure 7:
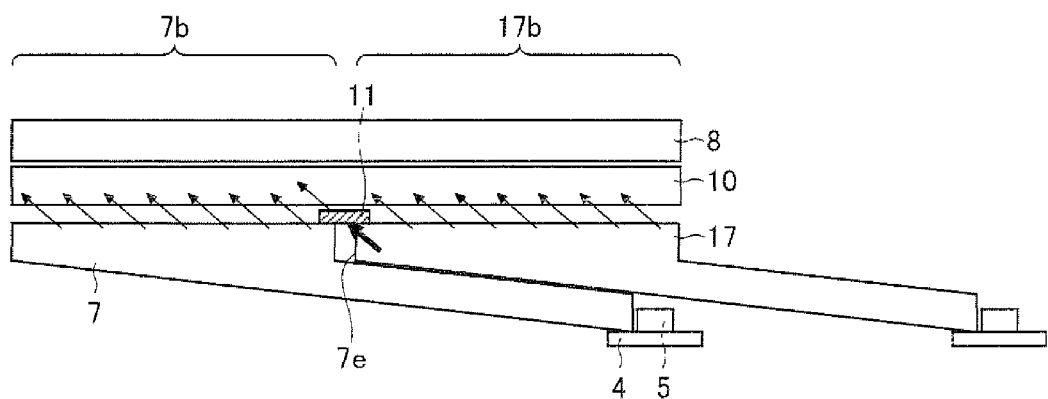
FIG. 7 is a cross-section view schematically illustrating the configuration of a part of a liquid crystal display device serving as variation 2.

FIG. 7 is a cross-section view schematically illustrating the configuration of a part of a liquid crystal display device 1 serving as variation 2. Variation 2 includes light amount adjusting sections 11 provided directly on the respective light-emitting surfaces 7a of light guide plates 7 and 17. The light amount adjusting sections 11 are each disposed across the boundary between the light-emitting section 7b of the light guide plate 7 and the light-emitting section 17b of the light guide plate 17 so as to cover the boundary.

The arrangement of variation 2 allows each of the light amount adjusting sections 11 to completely cover the boundary between light guide plates 7 and 17. This surely causes light emitted from the end surface 7e of each light guide plate, the end surface 7e being located opposite from the corresponding light source 5, to be incident onto the corresponding light amount adjusting section 11. In other words, no light emitted from the end surface 7e directly leaks out without passing the corresponding light amount adjusting section 11. This surely reduces the amount of light causing bright lines and consequently further improves luminance uniformity.

[Embodiment 2]

A second embodiment of the present invention is described below with reference to FIGS. 8 through 15.

Embodiment 1 above describes a tandem-type backlight. In contrast, the present embodiment describes a tile-type backlight, which includes multiple light guide plates that are arranged in a plane and that do not overlap one another.

Figure 8:
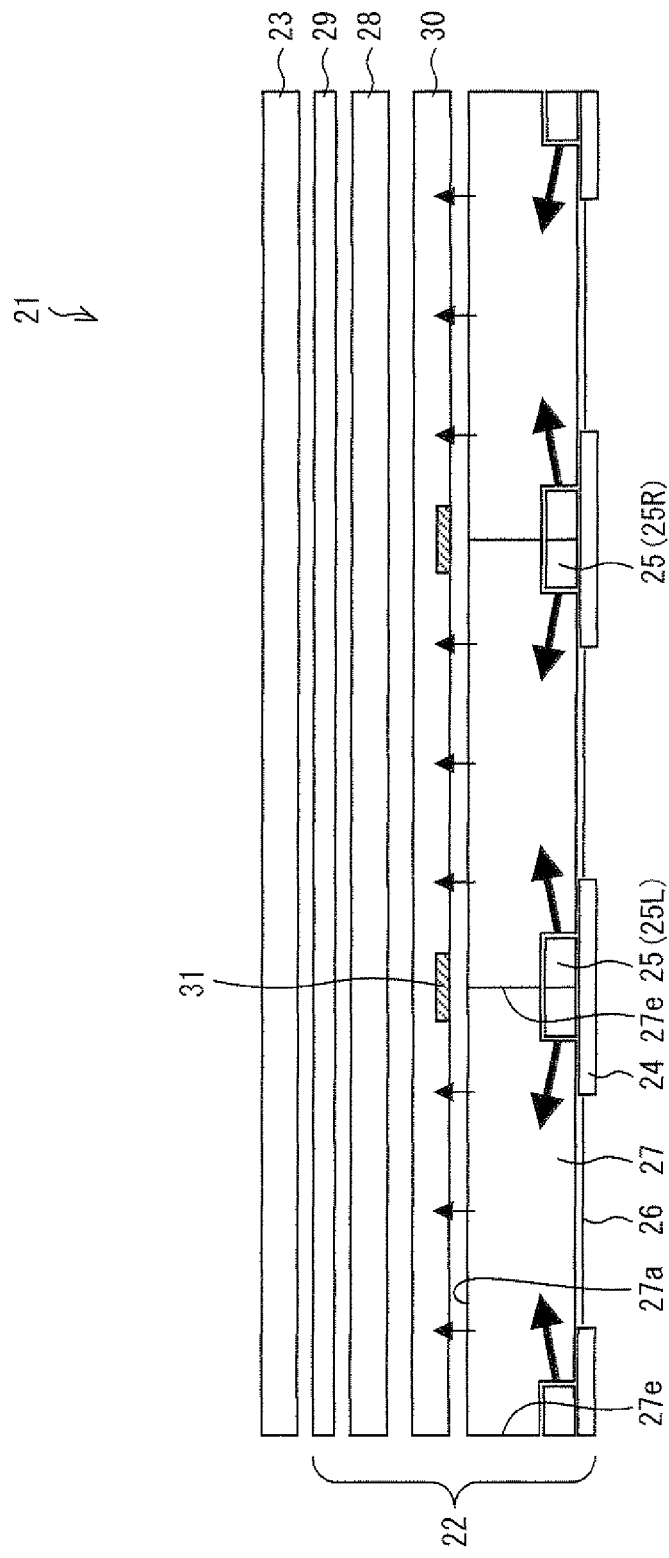
FIG. 8 is a cross-section view schematically illustrating the configuration of a liquid crystal display device in accordance with a second embodiment of the present invention.
Figure 9:
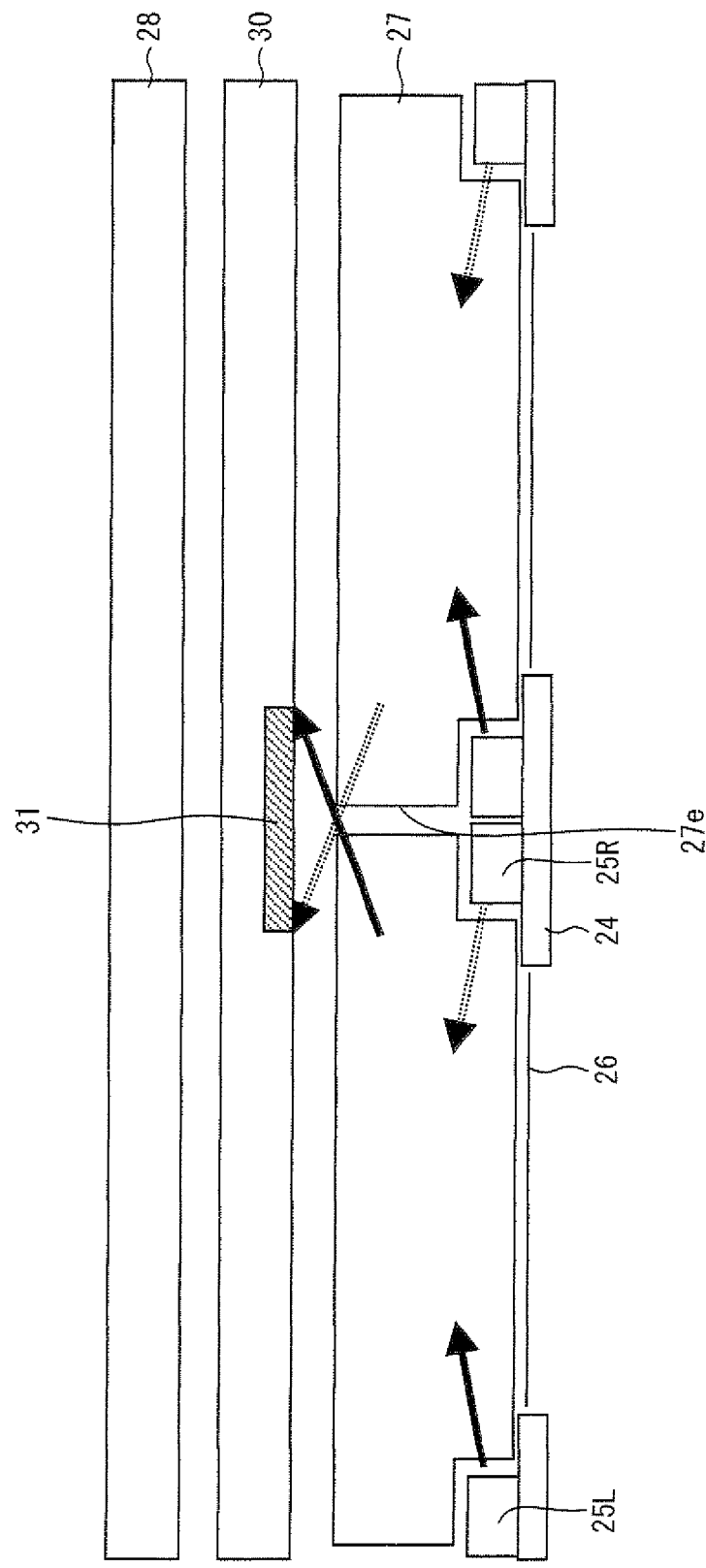
FIG. 9 is an enlarged cross-section view illustrating a part of the liquid crystal display device shown in FIG. 8.

FIG. 8 is a cross-section view schematically illustrating a configuration of a liquid crystal display device 21 according to the present embodiment. FIG. 9 is an enlarged cross-section view of a part of the liquid crystal display device 21. The liquid crystal display device 21 includes: a backlight 22 (illumination device); and a liquid crystal display panel 23 so provided as to face the backlight 22. The liquid crystal display panel 23 has an arrangement similar to an arrangement of the liquid crystal display panel 3 of Embodiment 1.

The following describes a configuration of the backlight 22 included in the liquid crystal display device 21.

The backlight 22 is disposed behind the liquid crystal display panel 23 (i.e., to face a surface opposite from a display surface of the liquid crystal display panel 23). As shown in FIG. 8, the backlight 22 includes: substrates 24, light sources 25, reflecting sheets 26, light guide plates 27, a diffusing plate 28, an optical sheet 29, a transparent plate 30, and light amount adjusting sections 31.

The light sources 25 are each, for example, a dot-shaped light source of a side light-emitting type, such as a light-emitting diode (LED). The following description uses, as an example, LEDs as the light sources 25. Use of LEDs of a side light-emitting type as the light sources 25, which LEDs each include chips of R, G, and B molded in one package, allows for production of an illumination device having a wide color reproduction range. The light sources 25 are each disposed on its corresponding substrate 24.

The light guide plates 27 each cause surface emission, from its light-emitting surface 27a, of light emitted from a corresponding light sources 25. The light-emitting surface 27a is a surface for emitting light onto an irradiation object.

Other constituent members each have an arrangement substantially identical with an arrangement of its corresponding member included in the backlight 2 of Embodiment 1. Thus, description of them is omitted here.

The backlight 22 of the present embodiment includes at least two light guide plates 27. More specifically, the backlight 22 includes multiple light guide plate units 32 arranged in a plane, which light guide plate units 32 are each formed by combination of a light guide plate 27 and light sources 25.

As shown in FIGS. 8 and 9, the backlight 22 of the present embodiment includes light guide plate units 32 so arranged in a plane as not to overlap one another. This allows respective light-emitting surfaces 27a of the multiple light guide plates 27, 27, . . . to form a flush light-emitting surface (light-emitting surface of the backlight 22 as a whole; light-emitting region).

Figure 10:
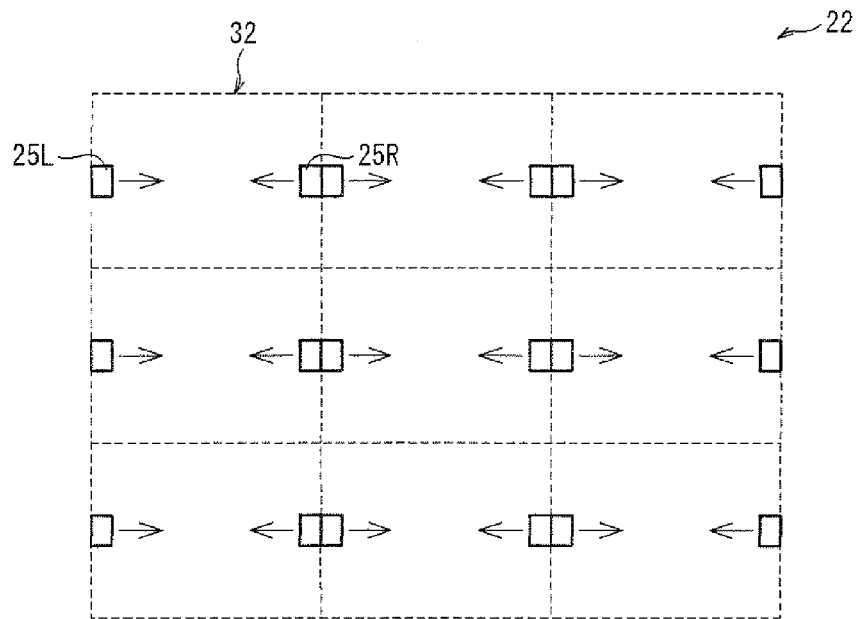
FIG. 10 is a plan view schematically illustrating the configuration of a backlight included in the liquid crystal display device shown in FIG. 8.

FIG. 10 is a plan view schematically illustrating the configuration of the backlight 22. As shown in FIG. 10, the backlight 22 includes multiple light guide plate units 32 arranged in a matrix, which light guide plate units 32 each include two light sources 25L and 25R (a pair of light sources). The backlight 22 of the present embodiment includes multiple light guide plate units 32 that are, as described above, arranged as if they were tiles that are laid out. The backlight 22 is thus referred to as a tile-type backlight.

Figure 11:
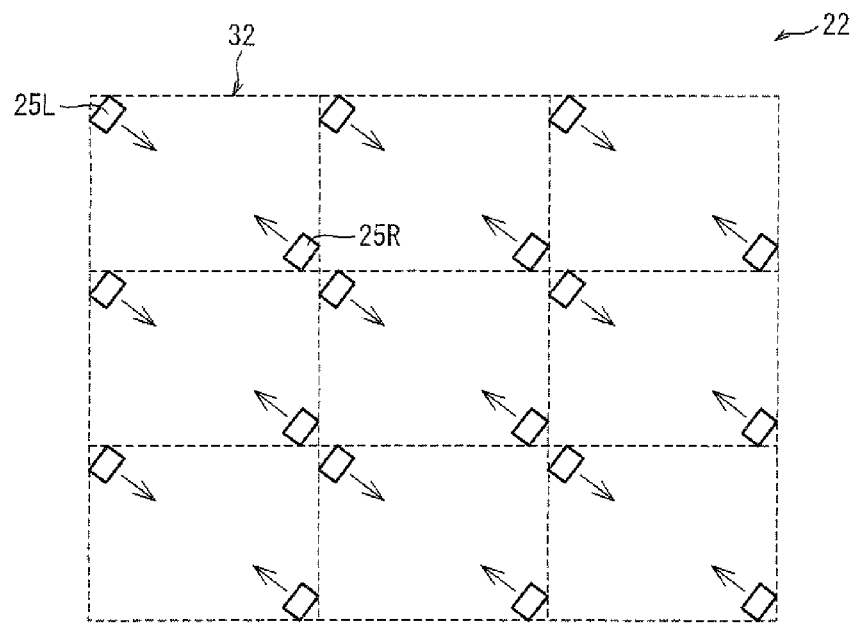
FIG. 11 is a plan view schematically illustrating the configuration of a backlight included in the liquid crystal display device shown in FIG. 8, which backlight has another arrangement.

FIG. 11 illustrates another example configuration of the backlight 22. The backlight 22 shown in FIG. 10 includes light guide plate units 32, each of which is rectangular and includes two light sources 25L and 25R each disposed in a vicinity of a middle of one of two opposite sides. In contrast, the backlight 22 shown in FIG. 11 includes light guide plate units 32, each of which is rectangular and includes two light sources 25L and 25R each disposed at one of two opposite corners connected by a diagonal line.

Figure 12:
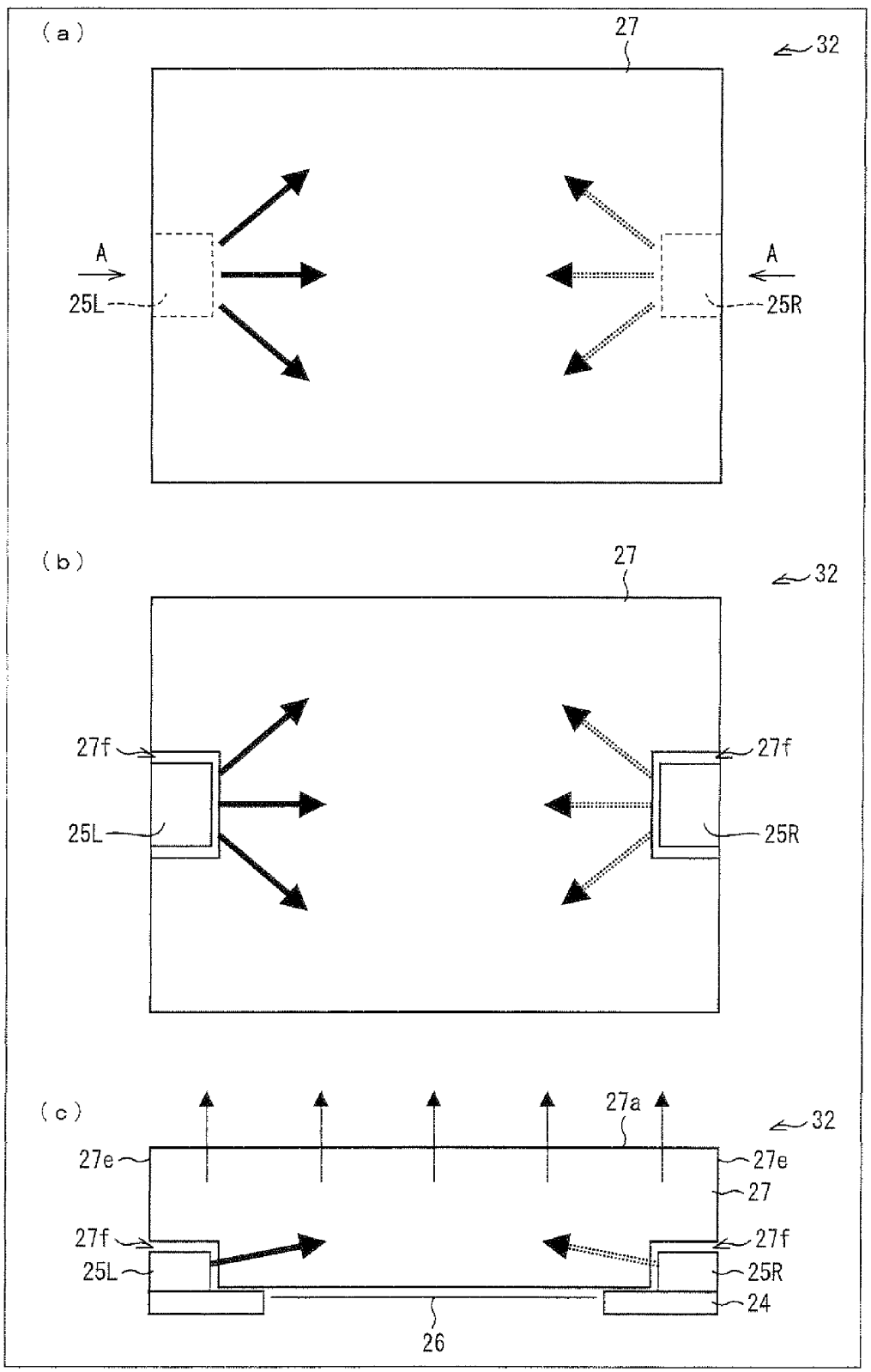
FIG. 12 is a view illustrating a light guide plate unit included in the liquid crystal display device shown in FIG. 8, where (a) is a plan view taken from a liquid crystal display panel, (b) is a plan view taken from the backlight, and (c) is a cross section of the light guide plate unit shown in (a), taken along A-A.

FIG. 12 illustrates an arrangement of a light guide plate unit 32 included in the backlight 22. FIG. 12 (a) is a plan view (top view) of the light guide plate unit 32 observed from the liquid crystal display panel 23 (i.e., from above). FIG. 12 (b) is a plan view (bottom view) of the light guide plate unit 32 observed in a direction opposite from a direction in which the light guide plate unit 32 is observed in FIG. 12 (*a*). FIG. 12 (*c*) is a cross-section view of the light guide plate unit 32 of FIG. 12 (*a*), taken along line A-A.

The light guide plate unit 32 shown in FIG. 12 includes: two light sources 25L and 25R; and a light guide plate 27 for causing surface emission of light from the light sources. The light sources 25L and 25R are each contained in one of hollow recesses 27*f* provided in the light guide plate 27. The light sources 25L and 25R face each other. Also, the light sources 25L and 25R are both mounted on a substrate 24. As shown in FIG. 12, the light sources 25L and 25R are set to emit light in such directions (indicated by arrows having solid lines and those having dotted lines, respectively) that each of the light sources 25L and 25R emits light toward the other.

In other words, the light guide plate unit 32 includes the two opposite dot-shaped light sources in such complementary positions that each of the light sources irradiates a region that is incapable of being irradiated by the other light source.

FIG. 13 schematically illustrates traveling directions of light from the light sources 25L and 25R included in the light guide plate unit 32. FIG. 13 (*a*) illustrates traveling directions of light from the light source 25L disposed on a left side of the light guide plate unit as viewed from above. FIG. 13 (*b*) illustrates the traveling directions of light from the light source 25R disposed on a right side of the light guide plate unit as viewed from above.

As shown in FIG. 13, the light sources 25L and 25R are so disposed as to face each other in such positions that light from each of the light sources travels through the light guide plate 27. As such, combining respective light-emitting regions generated by the light sources allows for light emission from the entire light-emitting surface 27*a* of the light guide plate 27. In the present embodiment, arranging multiple light guide plate units 32 described above allows for production of a large backlight free from dark portions.

As shown in FIG. 8, the light emitted from the light sources 25 as described above is transmitted through the light guide plates 27 while being diffused and reflected, is emitted from the light-emitting surfaces 27*a*, travels through the diffusing plate 28 and the optical sheet 29, and arrives at the liquid crystal display panel 23.

(Luminance Uniformity)

As in a tandem-type backlight, a tile-type backlight also poses a problem of bright lines on a display panel, which problem is caused by a gap between each two adjacent light guide plates, which bright lines impair luminance uniformity. The following describes a principle on which luminance is rendered non-uniform.

As described with reference to FIG. 18, part of light from each of the light sources 25 is repeatedly reflected in a corresponding light guide plate 27 and then is emitted from a corresponding light-emitting surface 27*a*. However, as in the case of FIG. 19, other part of the light from each of the light sources 25 is not reflected in the corresponding light guide plate 27 and directly arrives at an end surface 27*e* (see FIG. 12 (*c*)), which is located opposite from the corresponding light source 25. Such other part is not absorbed by the reflecting sheet 26, and therefore does not attenuate in its amount. This causes the other part to have an intensity higher than an intensity of the light emitted from the corresponding light-emitting surface 27*a*.

Figure 14:
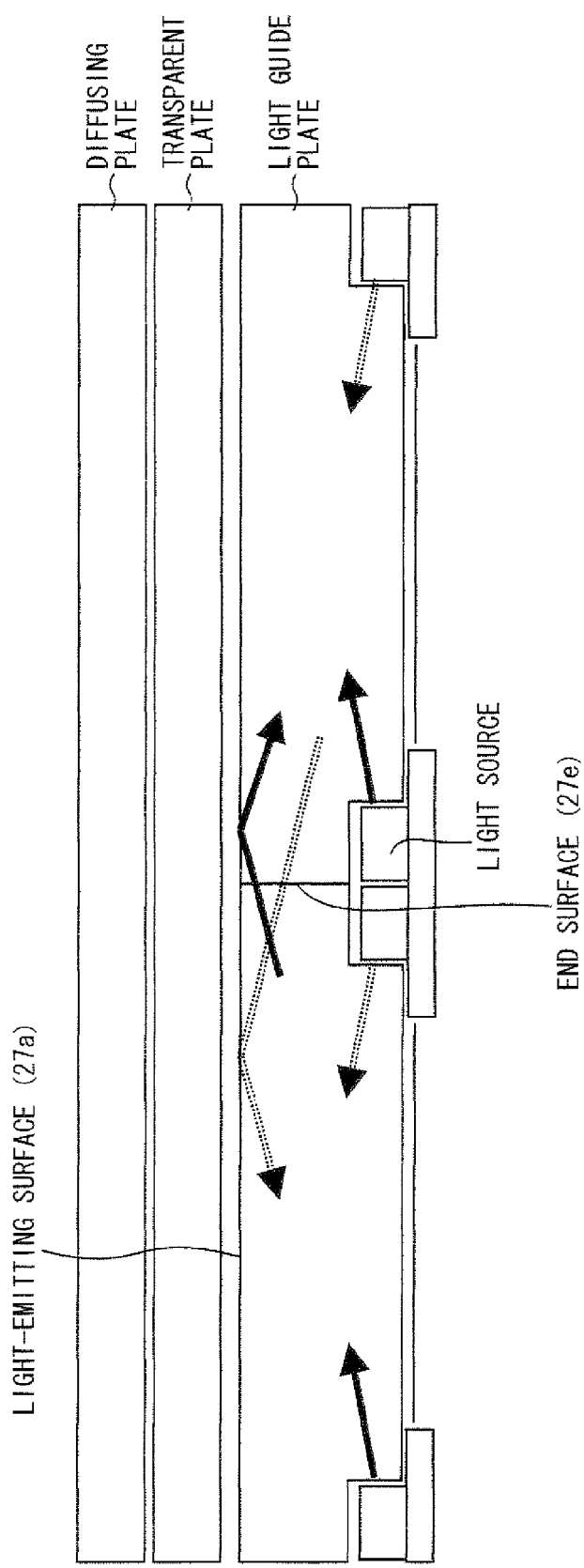
FIG. 14 is a cross-section view schematically illustrating the configuration of a tile-type backlight, in which any two adjacent light guide plate units are arranged with no gap between them.

Assume that, as shown in FIG. 14, a first light guide plate (on a left side in FIG. 14) and a second light guide plate (on a right side in FIG. 14) adjacent to the first light guide plate are disposed with no gap between them. In this case, light leaking from an end surface 27*e* of the first light guide plate is emitted onto an end surface 27*e* of the second light guide plate. The light is then reflected in the second light guide plate and is emitted from its light-emitting surface 27*a*. This causes no bright line.

Figure 15:
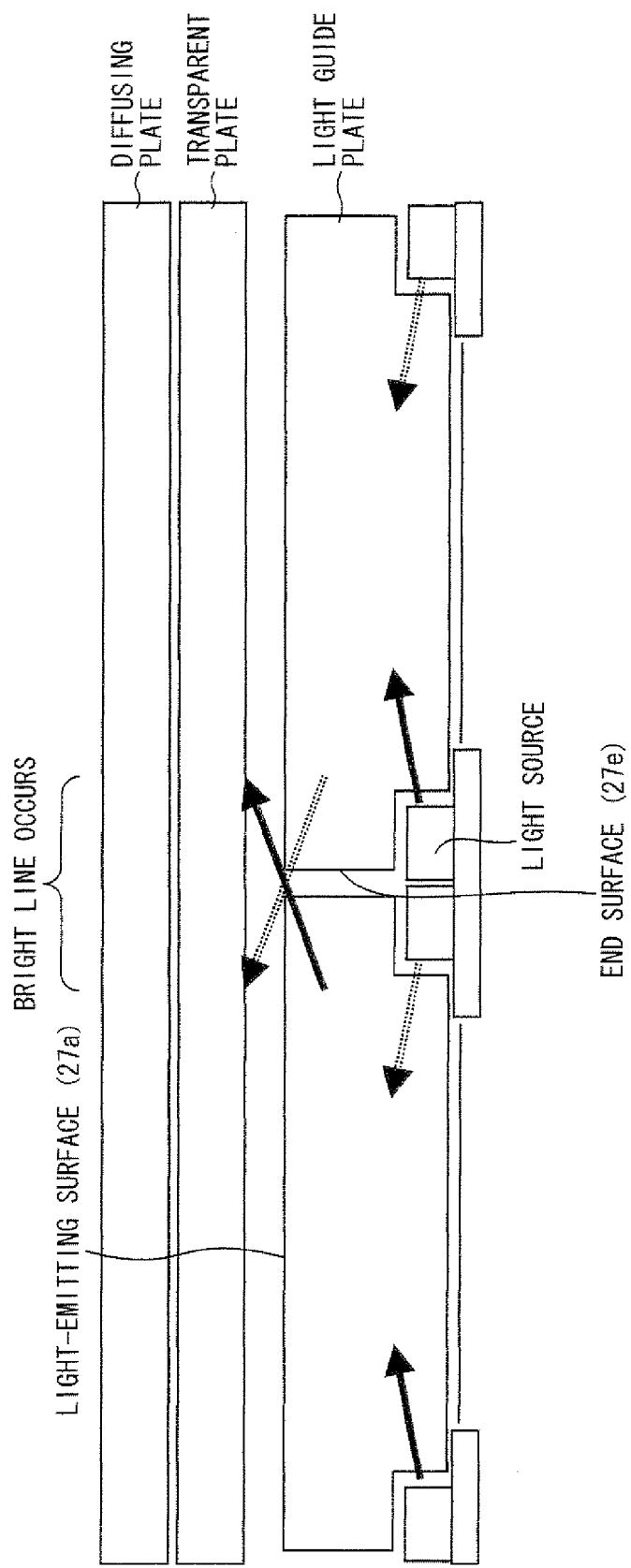
FIG. 15 is a cross-section view schematically illustrating the configuration of a tile-type backlight for actual use.
Figure 16:
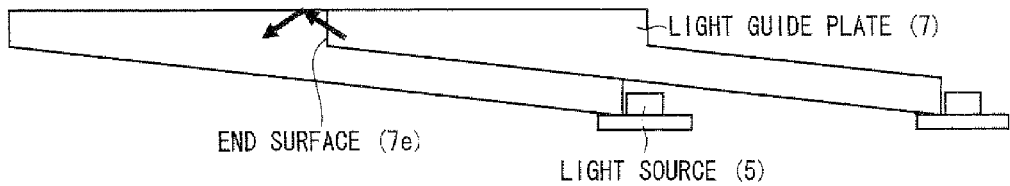
FIG. 16 is a cross-section view schematically illustrating the configuration of light guide plate units included in a tandem-type backlight.

However, as shown in FIG. 15, the first light guide plate and the second light guide plate adjacent to the first light guide plate are, in actual use, separated by a gap along a boundary between them. This causes part of light from a light source to be directly emitted from an end surface 27*e* of a corresponding light guide plate to the outside. This causes the part having a high intensity to appear as a bright line, and thereby results in non-uniform luminance as a whole.

In view of this, as in the arrangement of backlight 2 of Embodiment 1, the present embodiment includes light amount adjusting sections 31 so as to reduce an amount of light emitted from the end surface 27*e* of each of the light guide plate. As shown in FIGS. 8 and 9, each of the light amount adjusting sections 31 is separate from the diffusing plate 8 and is so disposed that an orthogonal projection of each of the light amount adjusting sections 31 onto the light-emitting surface (light-emitting region) covers the boundary between two adjacent light guide plates 27 and 27.

The light amount adjusting sections 31 are disposed as specified in the description of the backlight 2 of Embodiment 1. In other words, respective arrangements shown in FIGS. 4 through 7 are applicable to the tile-type backlight 22 of the present embodiment.

The respective light amount adjusting sections 11 and of the arrangements of Embodiments 1 and 2 each preferably has not only a function of reducing the amount of transmitting light, but also a function of reflecting incident light. The light amount adjusting sections 11 and 31, which are capable of reducing the amount of incident light and reflecting such light, allow for diffusion of more light. This further improves luminance uniformity.

As described above, because the liquid crystal display devices 1 and 21 of the first and second embodiments includes the backlights 2 and 22 respectively as described above, the liquid crystal display devices 1 and 21 can emit more uniform light to the liquid crystal display panels 3 and 23 respectively, thereby improving display quality.

Further, because the illumination device of the present invention has excellent luminance uniformity even in a case where its light-emitting area is large, it is particularly preferable that this illumination device is used as a backlight of a liquid crystal display device having a large screen. However, the present invention is not limited to this, and may be used as a backlight of any liquid crystal display panel.

As described above, illumination devices of the present invention each include light amount adjusting sections which reduce the amount of light incident upon them. The light amount adjusting sections are separate from the diffusing plate and so disposed as to cover the boundary between the light guide plates.

The above arrangement allows for production of an illumination device having further improved luminance uniformity.

As described above, a liquid crystal display device of the present invention includes one of the illumination devices of the present invention as a backlight.

The above arrangement allows light to be emitted more uniformly onto the liquid crystal display panel. This improves display quality.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

Industrial Applicability

The illumination devices of the present invention are each applicable as a backlight of a liquid crystal display device. In particular, the illumination devices of the present invention are each suitably applicable as a backlight of a large liquid crystal display device.

Reference Signs List 1, 21 Liquid crystal display device
2, 22 Backlight (Illumination device)
3, 23 Liquid crystal display panel
4, 24 Substrate
5 Light source (LED, Cold cathode fluorescent tube)
25 (25L and 25R) Light source (LED)
6, 26 Reflecting sheet
7, 17, 27 Light guide plate
7a, 27a Light-emitting surface (of light guide plate)
7b, 17b Light-emitting section
7c Light guide section
7e, 27e end surface
8, 28 Diffusing plate
9, 29 Optical sheet
10, 30 Transparent plate
11, 31 Light amount adjusting section
12, 32 Light guide plate unit

The invention claimed is:

1. An illumination device comprising:
a plurality of light sources;
a plurality of light guide plates each for causing surface emission of light from at least one of the plurality of light sources;
a diffusing plate for diffusing light from the plurality of light guide plates,
a light amount adjusting section for reducing an amount of light incident thereon being provided so as to be away from the diffusing plate, and so as to cover a boundary between any adjacent two of the plurality of light guide plates, and
wherein a transparent plate is located between the diffusing plate and the light amount adjusting section, and the light amount adjusting section is located between the light guide plates and the diffusing plate.

2. An illumination device comprising:
a plurality of light sources;
a plurality of light guide plates each for causing surface emission of light from at least one of the plurality of light sources;
a diffusing plate for diffusing light from the plurality of light guide plates,
each of the plurality of light guide plates including:
a light-emitting section having a light-emitting surface;
a light guide section for guiding, to the light-emitting section, light from the plurality of light sources,
a light-emitting section of one of any adjacent two of the plurality of light guide plates being provided above a light guide section of the other of the any adjacent two of the plurality of light guide plates,
said illumination device further comprising:
a light amount adjusting section, for reducing an amount of light incident thereon, provided so as to be away from the diffusing plate, and so as to cover a boundary between (i) the light-emitting section of said one of the any adjacent two of the plurality of light guide plates and (ii) a light-emitting section of said other of the any adjacent two of the plurality of light guide plates, and
wherein a transparent plate is located between the diffusing plate and the light amount adjusting section, and the light amount adjusting section is located between the light guide plates and the diffusing plate.

3. An illumination device comprising:
a plurality of light sources;
a plurality of light guide plates each for causing surface emission of light from at least one of the plurality of light sources;
a diffusing plate for diffusing light from the plurality of light guide plates,
the plurality of light guide plates being juxtaposed so as not to overlap one another,
a light amount adjusting section for reducing an amount of light incident thereon being provided so as to be away from the diffusing plate, and so as to cover a boundary between any adjacent two of the plurality of light guide plates, and
wherein a transparent plate is located between the diffusing plate and the light amount adjusting section, and the light amount adjusting section is located between the light guide plates and the diffusing plate.

4. The illumination device according to claim 1, wherein the light amount adjusting section is provided in a region which is closer to the plurality of light guide plates and which is between the diffusing plate and the plurality of light guide plates.

5. The illumination device according to claim 1, wherein the light amount adjusting section is provided above the light-emitting surfaces of the any adjacent two of the plurality of light guide plates so as to go over and cover the boundary.

6. The illumination device according to claim 1, wherein the light amount adjusting section is made of a semi-transmissive material for reducing an amount of light transmitted therethrough.

7. The illumination device according to claim 1, wherein the light amount adjusting section has a function of reducing an amount of light transmitted therethrough and a function of reflecting light.

8. The illumination device according to claim 1, wherein the light amount adjusting section is provided inside the transparent plate provided between the diffusing plate and the plurality of light guide plates.

9. A liquid crystal display device comprising as a backlight an illumination device recited in claim 1.

10. The illumination device according to claim 2, wherein the light amount adjusting section is provided in a region which is closer to the plurality of light guide plates and which is between the diffusing plate and the plurality of light guide plates.

11. The illumination device according to claim 3, wherein the light amount adjusting section is provided in a region which is closer to the plurality of light guide plates and which is between the diffusing plate and the plurality of light guide plates.

12. The illumination device according to claim 2, wherein the light amount adjusting section is provided above the light-emitting surfaces of the any adjacent two of the plurality of light guide plates so as to go over and cover the boundary.

13. The illumination device according to claim 3, wherein the light amount adjusting section is provided above the light-emitting surfaces of the any adjacent two of the plurality of light guide plates so as to go over and cover the boundary.

14. The illumination device according to claim 2, wherein the light amount adjusting section is made of a semi-transmissive material for reducing an amount of light transmitted therethrough.

15. The illumination device according to claim 3, wherein the light amount adjusting section is made of a semi-transmissive material for reducing an amount of light transmitted therethrough.

16. The illumination device according to claim 2, wherein the light amount adjusting section has a function of reducing an amount of light transmitted therethrough and a function of reflecting light.

17. The illumination device according to claim 3, wherein the light amount adjusting section has a function of reducing an amount of light transmitted therethrough and a function of reflecting light.

18. The illumination device according to claim 2, wherein the light amount adjusting section is provided inside the transparent plate provided between the diffusing plate and the plurality of light guide plates.

19. The illumination device according to claim 3, wherein the light amount adjusting section is provided inside the transparent plate provided between the diffusing plate and the plurality of light guide plates.

20. A liquid crystal display device comprising as a backlight an illumination device recited in claim 2.

21. A liquid crystal display device comprising as a backlight an illumination device recited in claim 3.

* * * * *